US008648512B2

(12) United States Patent
Jang

(10) Patent No.: US 8,648,512 B2
(45) Date of Patent: Feb. 11, 2014

(54) GENERATOR WITH IMPROVED GENERATION EFFICIENCY AND ROTATIONAL FORCE

(76) Inventor: Suk Ho Jang, Seoul (KR)

( * ) Notice: Subject to any disclaimer, the term of this patent is extended or adjusted under 35 U.S.C. 154(b) by 415 days.

(21) Appl. No.: 13/138,186

(22) PCT Filed: Dec. 17, 2009

(86) PCT No.: PCT/KR2009/007563
§ 371 (c)(1),
(2), (4) Date: Jul. 18, 2011

(87) PCT Pub. No.: WO2010/085044
PCT Pub. Date: Jul. 29, 2010

(65) Prior Publication Data
US 2011/0285234 A1    Nov. 24, 2011

(30) Foreign Application Priority Data

Jan. 23, 2009   (KR) .................. 10-2009-0005867

(51) Int. Cl.
*H02K 21/12* (2006.01)
*H02K 9/00* (2006.01)
*H02K 1/22* (2006.01)

(52) U.S. Cl.
USPC ............... 310/156.32; 310/63; 310/156.36; 310/268

(58) Field of Classification Search
USPC ............ 310/63, 156.32, 156.34–156.37, 268; 417/423.12
See application file for complete search history.

(56) References Cited

U.S. PATENT DOCUMENTS 4,578,606 A * 3/1986 Welterlin .................. 310/68 R
6,426,577 B1 * 7/2002 Sekiyama et al. ........... 310/162

FOREIGN PATENT DOCUMENTS

| JP | 63277455 A | * | 11/1988 |
| JP | 2002325412 A | * | 11/2002 |
| JP | 2003065204 A | * | 3/2003 |
| JP | 2005160197 A | * | 6/2005 |

* cited by examiner

*Primary Examiner* — Tran Nguyen
*Assistant Examiner* — Jose Gonzalez Quinones
(74) *Attorney, Agent, or Firm* — GWiPS

(57) ABSTRACT

An improved generator for using waterpower, wave-power or wind-power, comprising; a set of magnet plates and coil plates for mounting on a rotating shaft in parallel, the magnets installed on the magnet plates and the generating coils installed on the coil plates with constant-intervals in radial direction, a plurality of blades obliquely installed on circumference of the magnet plates and coil plates with mutually opposite direction, an inner annular cylinder and outer annular cylinder mounted on the coil plates to form annular container for inserting the magnets. A plurality of induction coils installed on the inner annular cylinder, a plurality of electromotive coils installed on the outer annular cylinder for proximately contact with ends of the magnets. The magnet plates and coil plates rotate in mutually opposite direction to enhance the quality of generation and repulsive force. Thus, the rotational reaction force is continuously generated between the magnets and coil plates to enhance the rotational force.

4 Claims, 3 Drawing Sheets

GENERATOR WITH IMPROVED GENERATION EFFICIENCY AND ROTATIONAL FORCE

BACKGROUND OF THE INVENTION

1. Field of the Invention

The present invention relates to a generator, which generate the electric power for using waterpower, wave-power or wind-power. More particularly, the improved generator has multi coil plates mounting the generating coils with constant intervals in radial direction, and the magnet plates mounting a plurality of magnets with constant intervals in radial direction that are installed on a rotating shaft in parallel. A plurality of induction coils and electromotive coils installed on inner and outer annular cylinders proximately contacting the opposite end of the magnets. Thus, the improved generator increase the efficiency as the coil plates and magnet plates are rotating in mutually opposite direction, as well as the rotational force is enhanced by increasing the repulsive force between coil plates and magnet plates.

2. Related Prior Art

A generator is a device, which converts the dynamic energy to the electric energy. It receives necessary rotational force from the waterpower, wave-power or steam or diesel engine to rotate the cylindrical magnets. The electric charges are induced in the coil wound on the iron core located around the magnet, when the magnets of a generator rotate. Then, the generator generates electric current.

For example, the bicycle headlights, or the vehicle generators, which can be easily found around us, are the common generators that are applying the same principle to generate the electricity. The major difference between the two generators is that the former has a permanent magnet in the coils and the latter has an electromagnet (rotor coil), which is not a permanent magnet.

However, the conventional generators as mentioned above must rotate a magnet, which is relatively heavy weight. Because of that reason, such the generators require strong enough starting power or rotational force.

Also, the conventional generator has the iron core installed for induction activation, an attractive force that attracts other rotating magnets in the center. Because the conventional generator requires the strong enough motor power, consequently the energy consumption is very high. Further, the attractive force acts as rotational resistance, it causes to consume the large rotational force for rotating the magnet.

In particular, the conventional cylindrical magnet and iron core cannot but adopt a tetra-polar induction method due to the constraint of installation space. Accordingly, the high-speed rotation is needed to produce electricity of necessary capacity and due to that; it has a problem that economic efficiency is considerably low.

When using a generator, electricity is produced by rotating a magnet by force using the rotational power of an extra drive motor, and electricity produced from the generator should be converted into electric current of a desirable voltage through an electric transformer, etc. Because of this, a considerable quantity of electric energy is lost at the drive motor and generator. A generation system of such a method is known to have an energy efficiency of about 35%. Therefore, it is considerably inefficient in terms of energy use and low in economic efficiency.

To solve such problems, Korean Patent Application No. 2008-067965 is filed by the applicant of the present invention. The generator disclosed in the above patent application comprises upper and lower fixed plates of non-magnet arranged in separation up and down, a plurality of magnets arranged on the fixed plate, and rotating discs arranged between the fixed plates. On the rotating disc are arranged horizontally wound coil units. The magnet on the lower fixed plate located below the rotating disc induces electric charge to generate electric current, and the magnet on the upper fixed plate located above provides alternatively attractive force and repulsive force to the coil unit in the direction of rotation.

Here, the electricity is produced through relative rotation of the magnet and the coil unit, so no-load rotation without attractive force being generated between each other occurs. Therefore, power productivity is excellent even with low-speed rotation. In addition, since attractive force and repulsive force provided by the centrifugal force of the rotating disc and the magnet are added to minimize the load loss of the rotating disc, economic efficiency is excellent and the generation efficiency is high.

However, the generator as mentioned above is of such a form that only the coil plate is rotated while the magnet plate with the magnets separately arranged is fixed. Therefore, it has a problem in that if wind power or water power is weak, sufficient generation capacity cannot be obtained and the generation efficiency is low.

Moreover, if various load elements that consume electric energy are connected to a generator as mentioned above, the generation efficiency is lowered by the load elements applied to the generator. Therefore, a generator having much higher generation efficiency and rotation performance is urgently needed through structural improvement of the generator as mentioned above.

SUMMARY OF THE INVENTION

Accordingly, to solve the above problems, it is an object of the present invention to provide a generator comprising that; a set of magnet plates (10, 10') and coil plates (20, 20') formed non-magnetic disc-shape for mounting on a rotating shaft (40) in parallel; a set of magnets (11, 11') arranged with constant intervals in radial direction to install on the magnet plates (10, 10'); a set of generating coils (21, 21') arranged with constant intervals in radial direction to install on the coil plates (20, 20'); a plurality of blades (12, 22) obliquely installed to circumference of the magnet plates (10, 10') and the coil plates (20, 20') with mutually opposite direction, so that the magnet plates (10, 10') and the coil plates (20, 20') are simultaneously rotating in opposite direction each other; and an inner annular cylinder (23) and outer annular cylinder (24) mounted on the coil plates (20, 20') to form an annular container for inserting the magnets (11, 11'), and on the outer circumference of the inner annular cylinder (23) installed induction coils (25) with constant intervals to proximately contact with the inner end of the magnets (11, 11'); and on the inner circumference of the outer annular cylinder (24) installed electromotive coils (26) with constant intervals to proximately contact to outer end of the magnets (11, 11'); wherein the induction coils (25) and electromotive coils (26) are connected each other by a direct current converting circuit (30); so that electric charges are induced between the generation coils (21, 21') and the magnets (11, 11') to generate electricity, when the magnet plates (10, 10') and the coil plates (20, 20') are rotating in mutually opposite direction, wherein the induced electric-charge activates on the induced coils (25) to be transmitted to the electromotive coils (26) through a direct current converting circuit (30) to generate repulsive force between the electromotive coils (26) and magnets (11, 11'), and rotational reaction force is generated continuously between the magnets (10, 10') and coil plates (20, 20') by the repulsive force to increase rotational force thereof.

In order to accomplish the foregoing object of the present invention, a generator is provided comprising; the blades (12, 22) that are integrally formed on the outer circumference of the magnet plates (10, 10') and the coil plates (20, 20'), which are formed obliquely outward and faced mutual opposite direction, each other. The magnet plates (10, 10') are fixed on the rotating shaft (40), and the coil plates (20, 20') are rotationally mounted on the rotating shaft (40) via bearings (41). The coil plates (20, 20') are fixed on the rotating shaft (40), and the magnet plates (10, 10') are rotationally mounted on the rotating shaft (40) via bearings (41).

A plurality of blades are obliquely mounted on the outer circumference of the magnet plates and coil plates in mutually opposite directions, so that the magnet plates and the coil plates are rotated simultaneously in mutually opposite directions, wherein the coil plates are formed an inner annular cylinder and outer annular cylinder at the ends of the magnets, and on the outer circumference of the inner annular cylinder are installed induction coils arranged with constant intervals toward the inside end of the magnets, and on the inner circumference of the outer annular cylinder are installed electromotive coils arranged with constant intervals toward the outside end of the magnets, wherein the induction coils and electromotive coils are connected each other by a direct current converting circuit.

According to the present invention, the improved generator of the present invention enhances the generating quality by rotating the magnet plates and coil plates in mutually opposite directions, even if the waterpower or wind-power is weak. In addition, even if the energy supply source such as wind-power, wave-power or water power acts continuously or intermittently, the rotational force between the magnet plates and coil plates is increased greatly by the electromotive coils that confer repulsive force on the magnets to make it possible to produce much higher generation energy, so it is very economical.

DETAILED DESCRIPTION OF THE PREFERRED EMBODIMENTS

Terms or words used in the specification and claims should not be construed as limited to a lexical meaning, and should be understood as appropriate notions by the inventor based on that he/she is able to define terms to describe his/her invention in the best way to be seen by others. Therefore, embodiments and drawings described herein are simply exemplary and not exhaustive, and it will be understood that various modifications and equivalents may be made to take the place of the embodiments.

Hereinafter, preferred embodiments of the present invention will be described in more detail with reference to the accompanying drawings.

Figure 1:
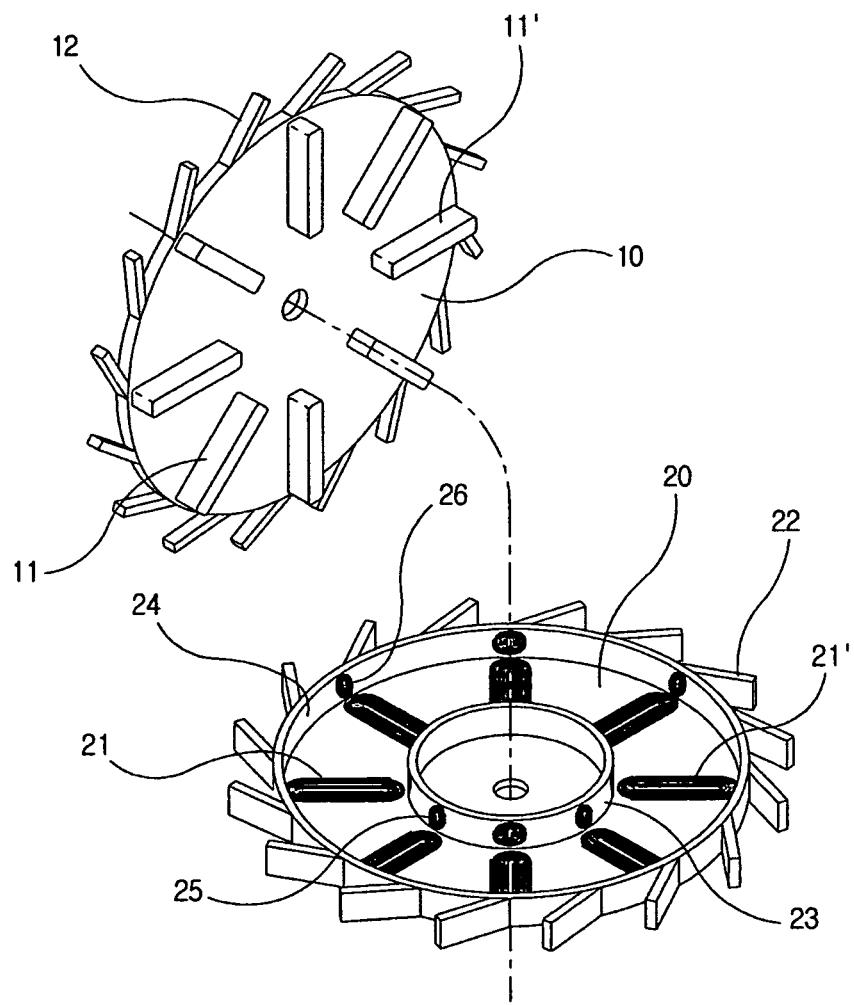
FIG. 1 is an exploded perspective view showing a magnet plate and coil plate of a generator according to the present invention.
Figure 2:
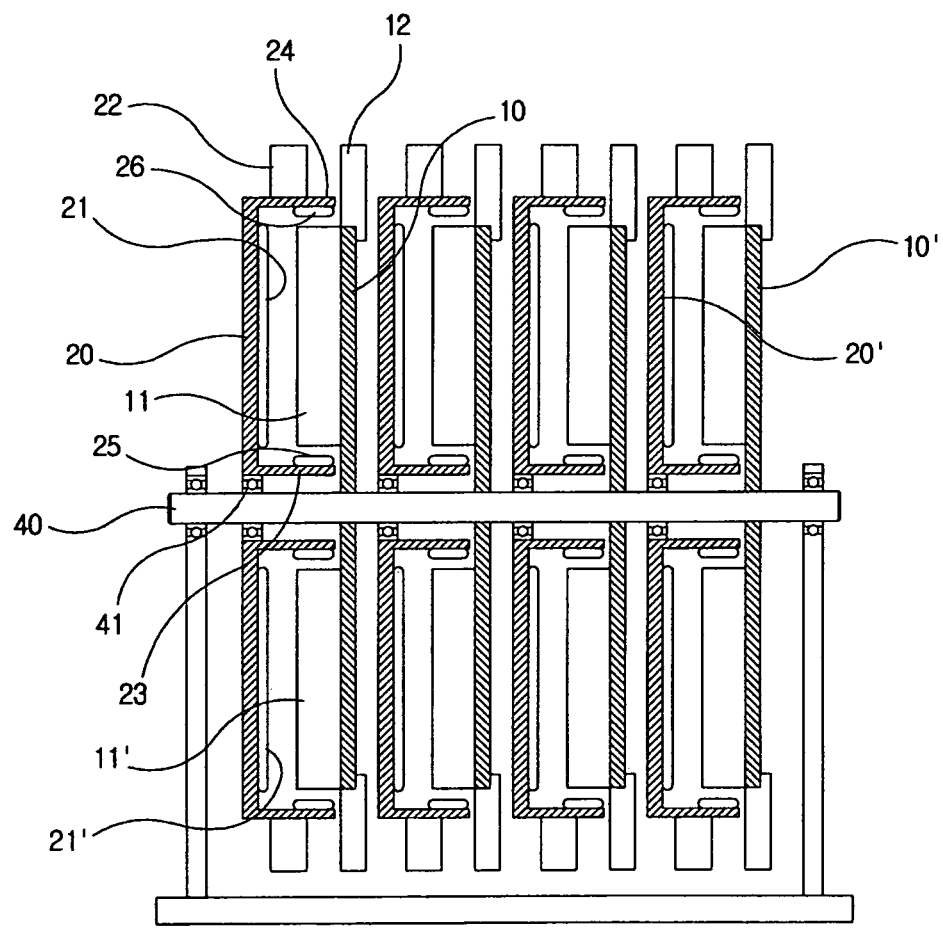
FIG. 2 is a sectional view showing the assembled state of the generator according to the present invention.
Figure 3:
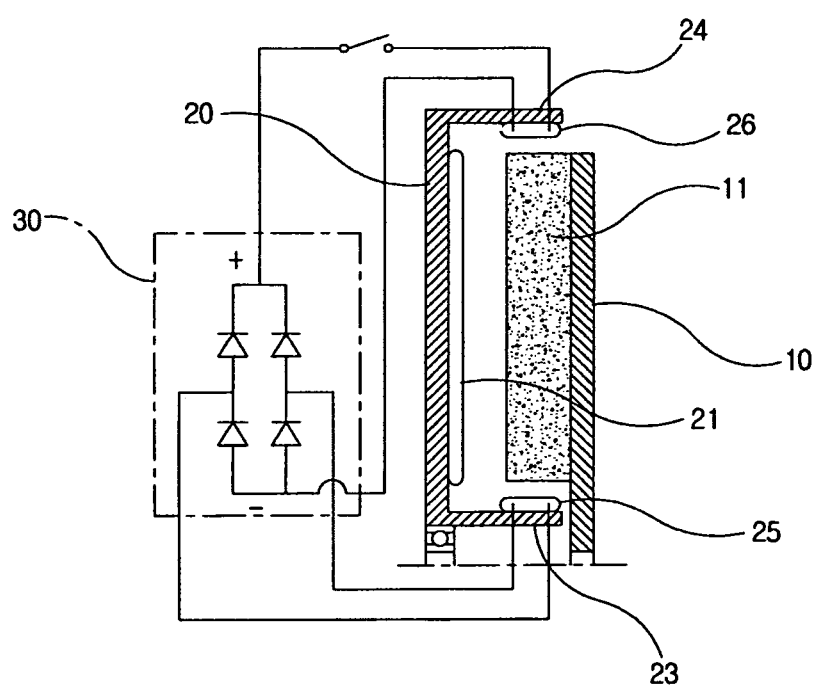
FIG. 3 is an enlarged sectional view showing major parts of the generator according to the present invention.

FIG. 1 is an exploded perspective view showing a magnet plate and coil plate of a generator according to the present invention, FIG. 2 is a sectional view showing the assembled state of the generator according to the present invention, and FIG. 3 is an enlarged sectional view showing major parts of the generator according to the present invention.

An improved generator of the present invention comprising:; a set of magnet plates (10, 10') and coil plates (20, 20') formed non-magnetic disc-shape for mounting on a rotating shaft (40) in parallel, a set of magnets (11, 11') arranged with constant intervals in radial direction to install on said magnet plates (10, 10'), a set of generating coils (21, 21') arranged with constant intervals in radial direction to install on said coil plates (20, 20'), a plurality of blades (12, 22) obliquely installed to circumference of said magnet plates (10, 10') and said coil plates (20, 20') with mutually opposite direction, so that said magnet plates (10, 10') and said coil plates (20, 20') are simultaneously rotating in opposite direction each other, and an inner annular cylinder (23) and outer annular cylinder (24) mounted on said coil plates (20, 20') to form an annular container for inserting the magnets (11, 11'), and on the outer circumference of said inner annular cylinder (23) installed induction coils (25) with constant intervals to proximately contact with the inner end of the magnets (11, 11'), and on the inner circumference of the outer annular cylinder (24) installed electromotive coils (26) with constant intervals to proximately contact to outer end of the magnets (11, 11'), wherein said induction coils (25) and electromotive coils (26) are connected each other by a direct current converting circuit (30); so that electric charges are induced between the generation coils (21, 21') and the magnets (11, 11') to generate electricity, when said magnet plates (10, 10') and said coil plates (20, 20') are rotating in mutually opposite direction, wherein the induced electric-charge activates on the induced coils (25) to be transmitted to the electromotive coils (26) through a direct current converting circuit (30) to generate repulsive force between said electromotive coils (26) and magnets (11, 11'), and rotational reaction force is generated continuously between the magnets (10, 10') and coil plates (20, 20') by the repulsive force to increase rotational force thereof.

As shown in the drawings, in the generator according to the present invention, when the magnet plates 10 and 10' and coil plates 20 and 20' arranged in parallel from each other rotate by the external force, the electric charge is induced from a plurality of magnets 11 and 11' arranged with constant intervals on the magnets plates 10 and 10' in the generation coils 21 and 21' arranged with constant intervals on the coil plates 20 and 20' in radial direction. Accordingly, the electricity is generated from generation coils 21 and 21' of serially-connected shape, so it is possible to obtain desired electric power.

At this time, according as the magnet plates 10 and 10' or coil plates 20 and 20' rotate, the polarity of electric charge acting on the generation coils 21 and 21' is repetitively changed to generate electricity.

In the present invention, the magnet plates 10 and 10' and coil plates 20 and 20' are constructed in such a way that they rotate in mutually opposite directions. For this, both of the magnet plates 10 and 10' are fixed on a single rotating shaft 40 both ends of which are mounted rotationally on a main body of the generator, and the coil plates 20 and 20' are rotationally mounted on the rotating shaft 40 via bearings 41.

On the whole of the outer circumference of these magnet plates 10 and 10' and coil plates 20 and 20' are formed in protrusion respectively a plurality of blades 12 and 22 that are inclined in mutually opposing directions.

At this time, the blades 12 and 22 may be formed in such a way that they protrude monolithically from the outer circumference of the magnet plates 10 and 10' and coil plates 20 and 20', or may be attached in a state inclined at a predetermined angle by using joining means such as a hinge or bracket. Also, these blades may be formed on the outer circumference or formed transversely in protrusion on the inner circumference.

Also, in this embodiment is illustrated a structure in which the magnet plates 10 and 10' are fixed on the rotating shaft 40, and the coil plates 20 and 20' are rotationally mounted on the rotating shaft 40 via bearings 41 for relative rotation. But in another embodiment, it is also possible to adopt a structure in which the magnet plates 10 and 10' are rotationally mounted on the rotating shaft 40 via bearings 41, and the coil plates 20 and 20' are fixed on the rotating shaft 40 for relative rotation.

If external force such as water power, wind power or wave power acts on the blades 12 and 22 of the magnet plates 10 and 10' and coil plates 20 and 20', the magnet plates 10 and 10' and coil plates 20 and 20' are rotated by external force acting on the blades 12 and 22 which are arranged inclined at a predetermined angle in mutually opposing directions as mentioned above. At this time, the blades 12 and 22 are arranged inclined in mutually opposing directions, so the magnet plates 10 and 10' and coil plates 20 and 20' are rotated in mutually opposing directions.

Accordingly, even if a relatively weak water power, wind power or wave power is applied, the magnet plates 11 and 11' and induction coils 25 rotating in mutually opposing directions have the quantity of rotation doubled. Therefore, the electricity generation is greatly increased in proportion to the doubled quantity of rotation.

Also, on the coil plates 20 and 20' are formed in protrusion respectively an inner cylinder 23 and outer cylinder 24 at the locations separated at a predetermined interval in a radius direction from both ends of the magnets 11 and 11'. On the outer circumference of the inner cylinder 23 are correspondingly arranged the induction coils 25 toward the inside end of the magnets 11 and 11', and on the inner circumference of the outer cylinder 24 are correspondingly arranged the electromotive coils 26 toward the outside end of the magnets 11 and 11'.

At this time, since the induction coils 25 and electromotive coils 26 are mutually connected through a direct current converting circuit 30, the current generated from the induction coils 25 is converted into a form of direct current as it passes through the direct current converting circuit 30 before it is supplied to the electromotive coils 26.

Accordingly, when the magnet plates 10 and 10' and coil plates 20 and 20' are rotated by external force such as water power, wind power or wave power, electric charge is induced from magnets 11 and 11' in generation coils 21 and 21' to cause generation of electricity. At the same time, extra generation is made partially also through the induction coils 25. Since the electricity produced through the induction coils 25 is converted into direct current as it passes through the direct current converting circuit 30, the polarity of the electromotive coils 26 is converted repetitively by a switching action so as to be equal to the polarity of the magnets 11 and 11'. After all, since rotational reaction is generated continuously on the magnet plates 10 and 10' and coil plates 20 and 20' due to repulsive force generated by the change of these polarities, it is possible to further increase the rotational force thereof.

Therefore, even if a load acts on the magnet plates 10 and 10' and coil plates 20 and 20' by various load elements connected to the generator, it is possible to obtain a maximum generation efficiency by increasing the rotational force of the magnet plates 10 and 10' and coil plates 20 and 20' by repulsive force generated from the electromotive coils 26.

As described above, the generator according to the present invention can be effectively used also in an area where wind is weak or wind blows intermittently, can use water power flowing along a brook, small stream or sewage pipe or water supply pipe, and can be installed on the rooftop of a common house to be used for the purpose of supplying electric power indoors.

Although the present invention has been described in connection with the exemplary embodiments illustrated in the drawings, it is only illustrative. It will be understood by those skilled in the art that various modifications and equivalents can be made to the present invention. Therefore, the true technical scope of the present invention should be defined by the appended claims.

What is claimed is:

1. An improved generator comprising:
   a set of magnet plates (10, 10') and coil plates (20, 20') formed non-magnetic disc-shape for mounting on a rotating shaft (40) in parallel,
   a set of magnets (11, 11') arranged with constant intervals in radial direction to install on said magnet plates (10, 10'),
   a set of generating coils (21, 21') arranged with constant intervals in radial direction to install on said coil plates (20, 20'),
   a plurality of blades (12, 22) obliquely installed to circumference of said magnet plates (10, 10') and said coil plates (20, 20') with mutually opposite direction, so that said magnet plates (10, 10') and said coil plates (20, 20') are simultaneously rotating in opposite direction each other, and
   an inner annular cylinder (23) and outer annular cylinder (24) mounted on said coil plates (20, 20') to form an annular container for inserting the magnets (11, 11'), and on the outer circumference of said inner annular cylinder (23) installed induction coils (25) with constant intervals to proximately contact with the inner end of the magnets (11, 11'), and on the inner circumference of the outer annular cylinder (24) installed electromotive coils (26) with constant intervals to proximately contact to outer end of the magnets (11, 11'), wherein said induction coils (25) and electromotive coils (26) are connected each other by a direct current converting circuit (30); so that electric charges are induced between the generation coils (21, 21') and the magnets (11, 11') to generate electricity, when said magnet plates (10, 10') and said coil plates (20, 20') are rotating in mutually opposite direction, wherein the induced electric-charge activates on the induced coils (25) to be transmitted to the electromotive coils (26) through a direct current converting circuit (30) to generate repulsive force between said electromotive coils (26) and magnets (11, 11'), and rotational reaction force is generated continuously between the magnets (10, 10') and coil plates (20, 20') by the repulsive force to increase rotational force thereof.

2. The generator according to claim 1, wherein the blades (12, 22) that are integrally formed on the outer circumference of said magnet plates (10, 10') and said coil plates (20, 20'), which are formed obliquely outward and faced mutual opposite direction, each other.

3. The generator according to claim 1, wherein said magnet plates (10, 10') are fixed on said rotating shaft (40), and said coil plates (20, 20') are rotationally mounted on the rotating shaft (40) via bearings (41).

4. The generator according to claim 1, wherein said coil plates (20, 20') are fixed on said rotating shaft (40), and said magnet plates (10, 10') are rotationally mounted on the rotating shaft (40) via bearings (41).

* * * * *